US012731898B1

(12) United States Patent
Chang et al.

(10) Patent No.: US 12,731,898 B1
(45) Date of Patent: Sep. 8, 2026

(54) MOBILE DEVICE SUPPORTING WIDEBAND OPERATION

(71) Applicant: Acer Incorporated, New Taipei City (TW)

(72) Inventors: Kun-Sheng Chang, New Taipei City (TW); Ching-Chi Lin, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 15 days.

(21) Appl. No.: 19/179,238

(22) Filed: Apr. 15, 2025

(30) Foreign Application Priority Data

Mar. 13, 2025 (TW) ................................ 114109269

(51) Int. Cl.
*H01Q 9/04* (2006.01)
*H01Q 5/20* (2015.01)

(52) U.S. Cl.
CPC ............. *H01Q 9/0414* (2013.01); *H01Q 5/20* (2015.01)

(58) Field of Classification Search
CPC ............................... H01Q 9/0414; H01Q 5/20
See application file for complete search history.

(56) References Cited

FOREIGN PATENT DOCUMENTS

| | | | |
|---|---|---|---|
| CN | 205882166 | U | 1/2017 |
| CN | 118099719 | A | 5/2024 |
| CN | 118399078 | A | 7/2024 |
| TW | 202401897 | A | 1/2024 |
| TW | 202425419 | A | 6/2024 |

OTHER PUBLICATIONS

Chinese language office action dated Apr. 8, 2026, issued in application No. TW 114109269.

*Primary Examiner* — Graham P Smith
(74) *Attorney, Agent, or Firm* — McClure, Qualey & Rodack, LLP

(57) ABSTRACT

A mobile device includes a ground element, a first radiation element, a feeding radiation element, a second radiation element, a connection radiation element, a third radiation element, a fourth radiation element, a fifth radiation element, and a stamping metal element. The first radiation element is coupled to the ground element. The second radiation element is coupled to the feeding radiation element. The second radiation element is adjacent to the first radiation element. The connection radiation element is coupled to the feeding point. The third radiation element is coupled to the connection radiation element. The fourth radiation element is coupled to the connection radiation element. The connection radiation element, the third radiation element, and the fourth radiation element are adjacent to the first radiation element. The fifth radiation element is coupled to the connection radiation element. The stamping metal element is coupled to the first radiation element.

15 Claims, 5 Drawing Sheets

MOBILE DEVICE SUPPORTING WIDEBAND OPERATION

CROSS REFERENCE TO RELATED APPLICATIONS

This application claims priority of Taiwan Patent Application No. 114109269 filed on Mar. 13, 2025, the entirety of which is incorporated by reference herein.

BACKGROUND OF THE INVENTION

Field of the Invention

The disclosure generally relates to a mobile device, and more particularly, it relates to a mobile device supporting wideband operations.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has too narrow operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to a mobile device for supporting wideband operations. The mobile device includes a ground element, a first radiation element, a feeding radiation element, a second radiation element, a connection radiation element, a third radiation element, a fourth radiation element, a fifth radiation element, and a stamping metal element. The first radiation element is coupled to the ground element. The feeding radiation element has a feeding point. The second radiation element is coupled to the feeding radiation element. The second radiation element is adjacent to the first radiation element. The connection radiation element is coupled to the feeding point. The third radiation element is coupled to the connection radiation element. The fourth radiation element is coupled to the connection radiation element. The connection radiation element, the third radiation element, and the fourth radiation element are adjacent to the first radiation element. The fifth radiation element is coupled to the connection radiation element. The stamping metal element is coupled to the first radiation element. The stamping metal element substantially extends along the first radiation element. An antenna structure is formed by the first radiation element, the feeding radiation element, the second radiation element, the connection radiation element, the third radiation element, the fourth radiation element, the fifth radiation element, and the stamping metal element.

In some embodiments, the first radiation element substantially has a large L-shape, and the second radiation element substantially has a small L-shape. The combination of the feeding radiation element, the connection radiation element, the third radiation element, the fourth radiation element, and the fifth radiation element substantially has an H-shape.

In some embodiments, the mobile device further includes a dielectric substrate. The first radiation element, the feeding radiation element, the second radiation element, the connection radiation element, the third radiation element, the fourth radiation element, and the fifth radiation element are disposed on a specific surface of the dielectric substrate. The stamping metal element includes a first widening segment and a second widening segment. The first widening segment and the second widening segment are positioned above the dielectric substrate, and are substantially parallel to the specific surface.

In some embodiments, the first widening segment has a first vertical projection on the specific surface of the dielectric substrate. The first vertical projection at least partially overlaps both the first radiation element and the second radiation element. The second widening segment has a second vertical projection on the specific surface of the dielectric substrate. The second vertical projection overlaps neither the third radiation element nor the fifth radiation element.

In some embodiments, the antenna structure covers a first frequency band, a second frequency band, a third frequency band, a fourth frequency band, and a fifth frequency band. The first frequency band is from 600 MHz to 800 MHz. The second frequency band is from 800 MHz to 960 MHz. The third frequency band is from 1710 MHz to 2170 MHz. The fourth frequency band is from 2300 MHz to 2700 MHz. The fifth frequency band is from 3300 MHz to 3800 MHz.

In some embodiments, the length of the first radiation element is substantially equal to 0.25 wavelength of the first frequency band.

In some embodiments, the length of the feeding radiation element is from 0.125 to 0.25 wavelength of the second frequency band.

In some embodiments, the total length of the second radiation element, the feeding radiation element, the connection radiation element, and third radiation element is substantially equal to 1 wavelength of the third frequency band.

In some embodiments, the total length of the feeding radiation element and the second radiation element is substantially equal to 0.5 wavelength of the fourth frequency band.

In some embodiments, the total length of the fourth radiation element, the connection radiation element, and the fifth radiation element is substantially equal to 0.5 wavelength of the fifth frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
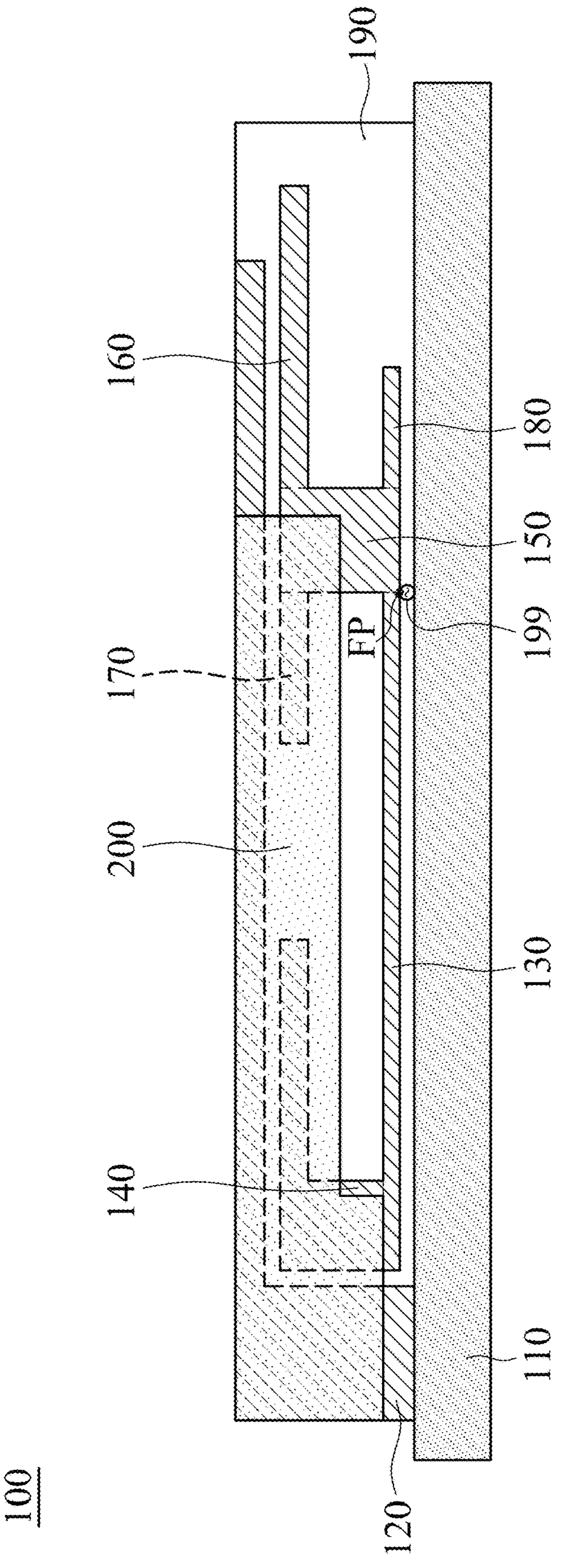
FIG. 1 is a top view of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
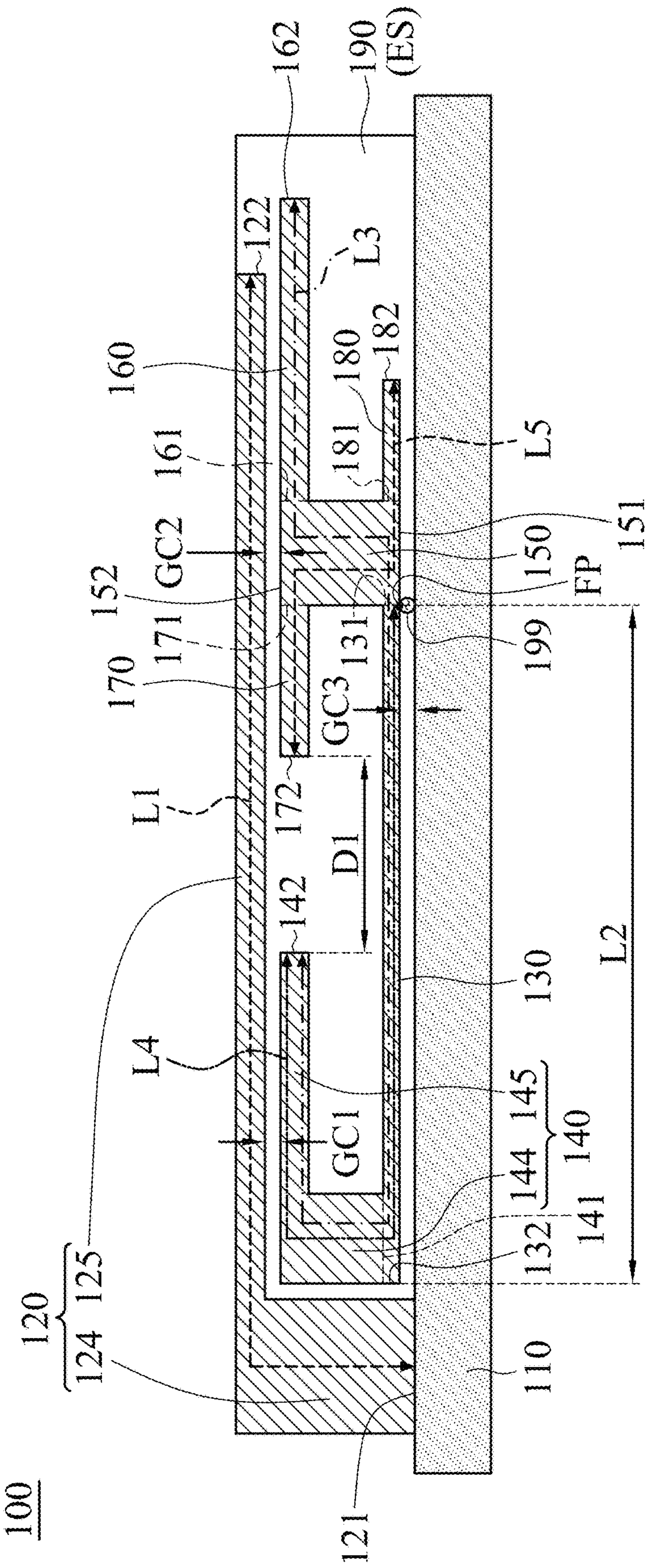
FIG. 2 is a partial view of a mobile device according to an embodiment of the invention.
Figure 3:
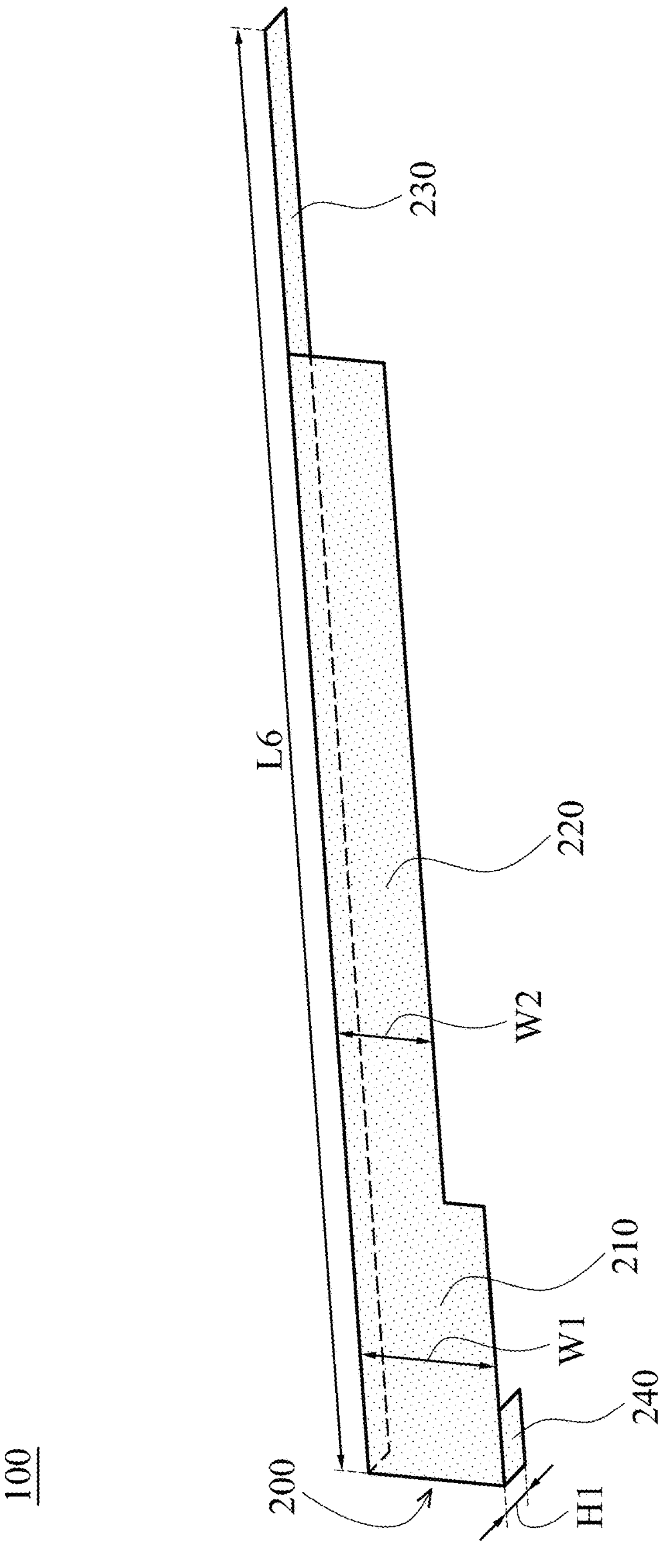
FIG. 3 is another partial view of a mobile device according to an embodiment of the invention.

FIG. 1 is a top view of a mobile device 100 according to an embodiment of the invention. FIG. 2 is a partial view of the mobile device 100 according to an embodiment of the invention. FIG. 3 is another partial view of the mobile device 100 according to an embodiment of the invention. Please refer to FIG. 1, FIG. 2 and FIG. 3 together. For example, the mobile device 100 may be a smartphone, a tablet computer, or a notebook computer. As shown in FIG. 1, FIG. 2 and FIG. 3, the mobile device 100 at least includes a ground element 110, a first radiation element 120, a feeding radiation element 130, a second radiation element 140, a connection radiation element 150, a third radiation element 160, a fourth radiation element 170, a fifth radiation element 180, and a stamping metal element 200. The ground element 110, the first radiation element 120, the feeding radiation element 130, the second radiation element 140, the connection radiation element 150, the third radiation element 160, the fourth radiation element 170, and the fifth radiation element 180 may all be made of metal materials, such as copper, silver, aluminum, iron, or their alloys. It should be understood that the mobile device 100 may further include other components, such as a processor, a touch control panel, a speaker, a power supply module, and/or a housing, although they are not displayed in FIG. 1.

For example, the ground element 110 may be implemented with a ground copper foil, but it is not limited thereto. In some embodiments, the ground element 110 is further coupled to a system ground plane (not shown) of the mobile device 100.

The first radiation element 120 may substantially have a large L-shape. Specifically, the first radiation element 120 has a first end 121 and a second end 122. The first end 121 of the first radiation element 120 is coupled to the ground element 110. The second end 122 of the first radiation element 120 is an open end. In some embodiments, the first radiation element 120 includes a first wide portion 124 adjacent to the first end 121 and a first narrow portion 125 adjacent to the second end 122, and the first narrow portion 125 is coupled through the first wide portion 124 to the ground element 110. It should be noted that the term "adjacent" or "close" over the disclosure means that the distance (spacing) between two corresponding elements is smaller than a predetermined distance (e.g., 10 mm or shorter), or means that the two corresponding elements directly touch each other (i.e., the aforementioned distance/spacing between them is reduced to 0).

The feeding radiation element 130 may substantially have a long straight-line shape, which may be substantially parallel to the ground element 110. Specifically, the feeding radiation element 130 has a first end 131 and a second end 132. A feeding point FP is positioned at the first end 131 of the feeding radiation element 130. The feeding point FP may be further coupled to a signal source 199. For example, the signal source 199 may be an RF (Radio Frequency) module.

The second radiation element 140 may substantially have a small L-shape (compared with the first radiation element 120). Specifically, the second radiation element 140 has a first end 141 and a second end 142. The first end 141 of the second radiation element 140 is coupled to the second end 132 of the feeding radiation element 130. The second end 142 of the second radiation element 140 is an open end. For example, the second end 122 of the first radiation element 120 and the second end 142 of the second radiation element 140 may substantially extend in the same direction. In some embodiments, the second radiation element 140 includes a second wide portion 144 adjacent to the first end 141 and a second narrow portion 145 adjacent to the second end 142, and the second narrow portion 145 is coupled through the second wide portion 144 to the feeding radiation element 130. In some embodiments, the second narrow portion 145 of the second radiation element 140 is adjacent to the first narrow portion 125 of the first radiation element 120. A first coupling gap GC1 may be formed between the first radiation element 120 and the second radiation element 140.

The connection radiation element 150 may substantially have a rectangular shape or a square shape. Specifically, the connection radiation element 150 has a first end 151 and a second end 152. The first end 151 of the connection radiation element 150 is coupled to the feeding point FP (or the first end 131 of the feeding radiation element 130). In some embodiments, the combination of the feeding radiation element 130, the connection radiation element 150, the third radiation element 160, the fourth radiation element 170, and the fifth radiation element 180 substantially has an H-shape.

The third radiation element 160 may substantially have a median straight-line shape (compared with the feeding radiation element 130). Specifically, the third radiation element 160 has a first end 161 and a second end 162. The first end 161 of the third radiation element 160 is coupled to the second end 152 of the connection radiation element 150. The second end 162 of the third radiation element 160 is an open end.

The fourth radiation element 170 may substantially have a short straight-line shape (compared with the third radiation element 160). Specifically, the fourth radiation element 170 has a first end 171 and a second end 172. The first end 171 of the fourth radiation element 170 is coupled to the second end 152 of the connection radiation element 150. The second end 172 of the fourth radiation element 170 is an open end. For example, the second end 162 of the third radiation element 160 and the second end 172 of the fourth radiation element 170 may substantially extend in opposite directions. In some embodiments, the connection radiation element 150, the third radiation element 160, and the fourth radiation element 170 are adjacent to the first narrow portion 125 of the first radiation element 120. A second coupling gap GC2 may be formed between the first radiation element 120 and each of the connection radiation element 150, the third radiation element 160, and the fourth radiation element 170. In alternative embodiments, a third coupling gap GC3 is formed between the ground element 110 and the feeding radiation element 130.

The fifth radiation element 180 may substantially have another short straight-line shape, which may be substantially parallel to the third radiation element 160. Specifically, the fifth radiation element 180 has a first end 181 and a second end 182. The first end 181 of the fifth radiation element 180 is coupled to the first end 151 of the connection radiation element 150. The second end 182 of the fifth radiation element 180 is an open end. For example, the second end 162 of the third radiation element 160 and the second end 182 of the fifth radiation element 180 may substantially extend in the same direction.

In some embodiments, the mobile device 100 further includes a dielectric substrate 190. For example, the dielectric substrate 190 may be an FR4 (Flame Retardant 4) substrate, a PCB (Printed Circuit Board), or an FPC (Flexible Printed Circuit). The first radiation element 120, the feeding radiation element 130, the second radiation element 140, the connection radiation element 150, the third radiation element 160, the fourth radiation element 170, and the fifth radiation element 180 may all be disposed on a specific surface ES of the dielectric substrate 190. Furthermore, the ground element 110 may be disposed adjacent to the dielectric substrate 190.

The stamping metal element 200 may have a 3D (Three-Dimensional) structure, which may be implemented with an additional iron element by using an SMT (Surface Mounted Technology) process. For example, the stamping metal element 200 may substantially extend along the first radiation element 120. Specifically, the stamping metal element 200 includes a first widening segment 210, a second widening segment 220, a first supporting segment 230, and a second supporting segment 240. The width W1 of the first widening segment 210 may be greater than the width W2 of the second widening segment 220. Both of the first widening segment 210 and the second widening segment 220 may be positioned above the dielectric substrate 190, and may be substantially parallel to its specific surface ES. The first supporting segment 230 and the second supporting segment 240 may be opposite to each other, and may be substantially perpendicular to the specific surface ES of the dielectric substrate 190. In addition, the first widening segment 210 and the second widening segment 220 may be coupled through the first supporting segment 230 and the second supporting segment 240 to the first radiation element 120. In some embodiments, the first widening segment 210 has a first vertical projection on the specific surface ES of the dielectric substrate 190, and the first vertical projection at least partially overlaps both of the first radiation element 120 and the second radiation element 140. In some embodiments, the second widening segment 220 has a second vertical projection on the specific surface ES of the dielectric substrate 190, and the second vertical projection overlaps neither the third radiation element 160 nor the fifth radiation element 180. However, the second vertical projection may at least partially overlap the first radiation element 120, the second radiation element 140, the connection radiation element 150, and the fourth radiation element 170.

In a preferred embodiment, an antenna structure of the mobile device 100 is formed by the first radiation element 120, the feeding radiation element 130, the second radiation element 140, the connection radiation element 150, the third radiation element 160, the fourth radiation element 170, the fifth radiation element 180, and the stamping metal element 200.

Figure 4:
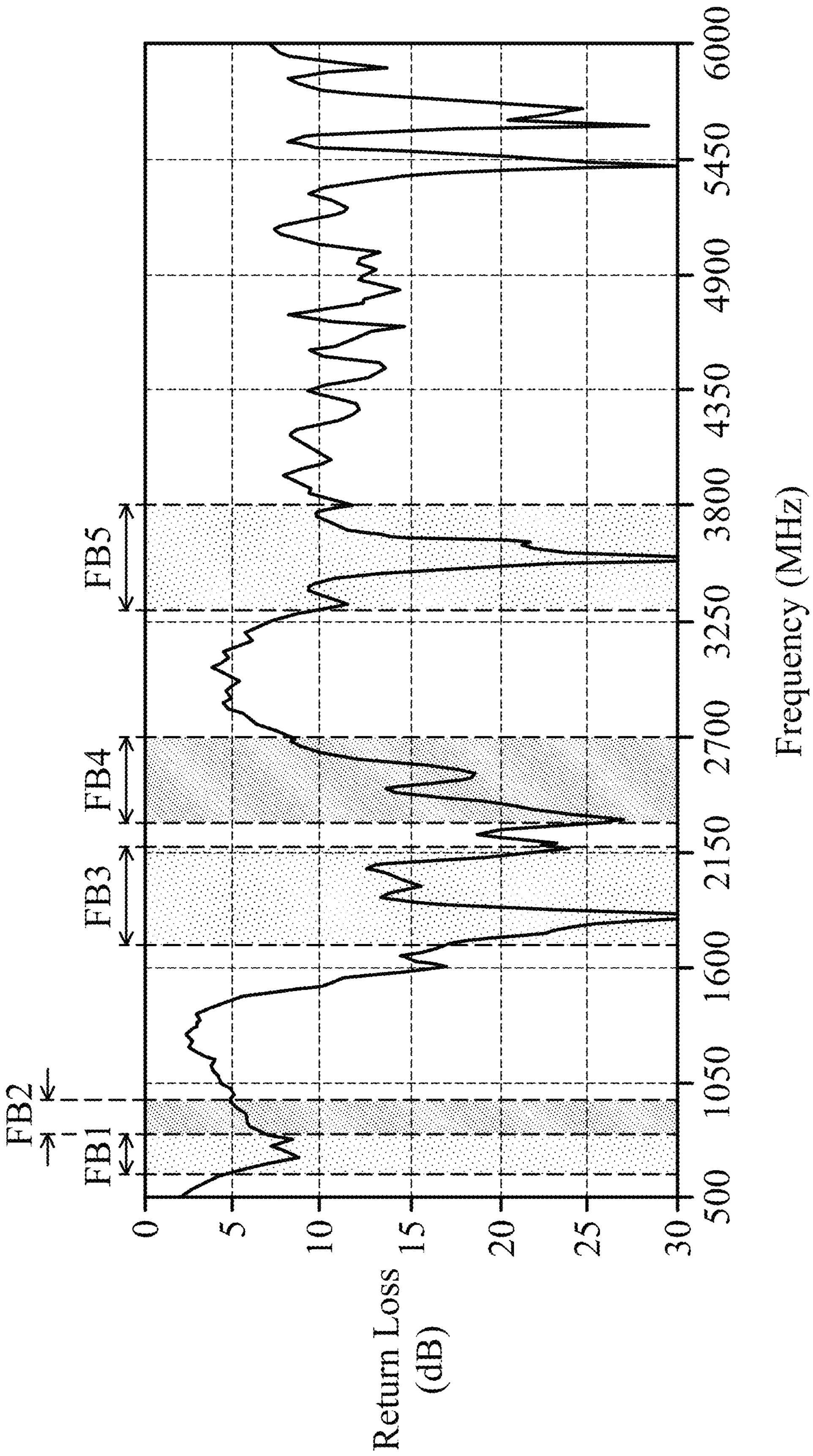
FIG. 4 is a diagram of return loss of an antenna structure of a mobile device according to an embodiment of the invention.

FIG. 4 is a diagram of return loss of the antenna structure of the mobile device 100 according to an embodiment of the invention. The horizontal axis represents the operational frequency (MHz), and the vertical axis represents the return loss (dB). According to the measurement of FIG. 4, the antenna structure of the mobile device 100 can cover a first frequency band FB1, a second frequency band FB2, a third frequency band FB3, a fourth frequency band FB4, and a fifth frequency band FB5. For example, the first frequency band FB1 may be from 600 MHz to 800 MHz, the second frequency band FB2 may be from 800 MHz to 960 MHz, the third frequency band FB3 may be from 1710 MHz to 2170 MHz, the fourth frequency band FB4 may be from 2300 MHz to 2700 MHz, and the fifth frequency band FB5 may be from 3300 MHz to 3800 MHz. Therefore, the mobile device 100 can support at least the wideband operations of LTE (Long Term Evolution).

In some embodiments, the operational principles of the antenna structure of the mobile device 100 will be described as follows. The first radiation element 120 can be excited to generate the first frequency band FB1. The feeding radiation element 130 can be excited to generate the second frequency band FB2. The feeding radiation element 130, the second radiation element 140, the connection radiation element 150, and the third radiation element 160 can be excited to generate the third frequency band FB3. The feeding radiation element 130 and the second radiation element 140 can be excited to generate the fourth frequency band FB4. The connection radiation element 150, the fourth radiation element 170, and the fifth radiation element 180 can be excited to generate the fifth frequency band FB5.

Figure 5:
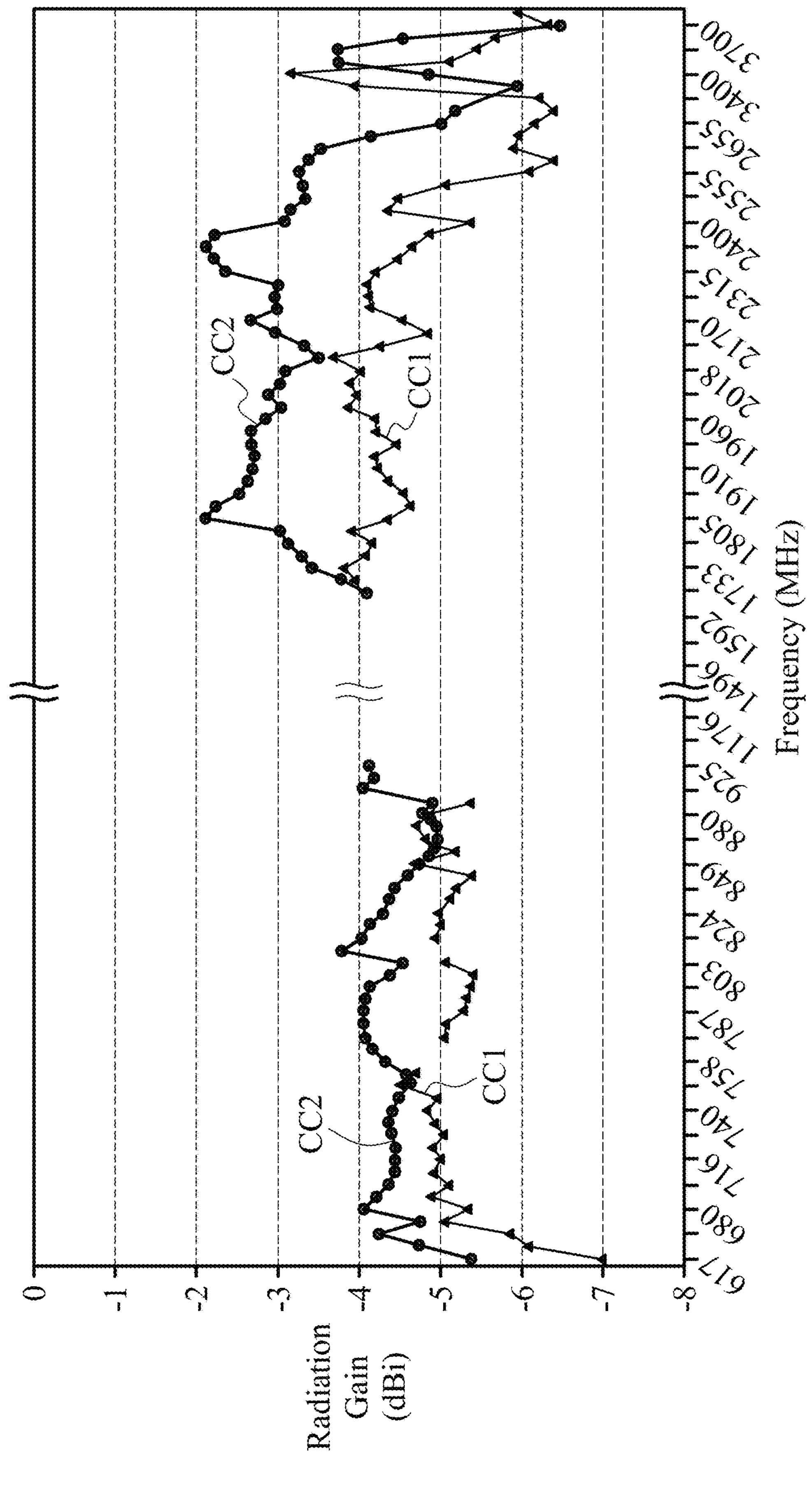
FIG. 5 is a diagram of radiation gain of an antenna structure of a mobile device according to an embodiment of the invention.

FIG. 5 is a diagram of radiation gain of the antenna structure of the mobile device 100 according to an embodiment of the invention. The horizontal axis represents the operational frequency (MHz), and the vertical axis represents the radiation gain (dBi). As shown in FIG. 5, a first curve CC1 represents the operational characteristic of the antenna structure when the mobile device 100 does not use the stamping metal element 200, and a second curve CC2 represents the operational characteristic of the antenna structure when the mobile device 100 uses the stamping metal element 200. According to the comparison result of FIG. 5, since the stamping metal element 200 of the mobile device 100 provides an additional current path for its antenna structure, the radiation gain of the antenna structure of the mobile device 100 can be increased by about 1 dBi to 3 dBi within the first frequency band FB1, the second frequency band FB2, the third frequency band FB3, the fourth frequency band FB4, and the fifth frequency band FB5 as mentioned above. Therefore, the proposed mobile device and its antenna structure of the invention can meet the requirements of practical applications of general mobile communication.

In some embodiments, the element sizes of the mobile device 100 will be described as follows. The length L1 of the first radiation element 120 may be substantially equal to 0.25 wavelength (λ/4) of the first frequency band FB1 of the antenna structure of the mobile device 100. The length L2 of the feeding radiation element 130 may be from 0.125 to 0.25 wavelength (λ/8~λ/4) of the second frequency band FB2 of the antenna structure of the mobile device 100. The total length L3 of the second radiation element 140, the feeding radiation element 130, the connection radiation element 150, and third radiation element 160 may be substantially equal to 1 wavelength (1λ) of the third frequency band FB3 of the antenna structure of the mobile device 100. The total length L4 of the feeding radiation element 130 and the second radiation element 140 may be substantially equal to 0.5 wavelength (λ/2) of the fourth frequency band FB4 of the antenna structure of the mobile device 100. The total length L5 of the fourth radiation element 170, the connection radiation element 150, and the fifth radiation element 180 may be substantially equal to 0.5 wavelength (λ/2) of the fifth frequency band FB5 of the antenna structure of the mobile device 100. The length L6 of the stamping metal element 200 may be shorter than or equal to 0.25 wavelength (λ/4) of the first frequency band FB1 of the antenna structure of the mobile device 100. The width W1 of the first widening segment 210 may be from 6 mm to 8 mm. The width W2 of the second widening segment 220 may be from 5 mm to 7 mm. The height H1 of the stamping metal element 200 on the dielectric substrate 190 may be from 2 mm to 3 mm. The width of the first coupling gap GC1 may be from 0.5 mm to 2 mm. The width of the second coupling gap GC2 may be from 0.5 mm to 2 mm. The width of the third coupling gap GC3 may be from 0.5 mm to 2 mm. The distance D1 between the second end 142 of the second radiation element 140 and the second end 172 of the fourth radiation element 170 may be from 10 mm to 20 mm. The above ranges of element sizes are calculated and obtained according to many experimental results, and they help to optimize the radiation gain, the impedance matching, and the operational bandwidth of the antenna structure of the mobile device 100.

The invention proposes a novel mobile device with a novel antenna structure. In comparison to the conventional design, the invention has the advantages of small size, wide bandwidth, high radiation gain, and low manufacturing cost. Therefore, the invention is suitable for application in a variety of communication devices.

Note that the above element sizes, element shapes, and frequency ranges are not limitations of the invention. An antenna designer can fine-tune these settings or values according to different requirements. It should be understood that the mobile device of the invention is not limited to the configurations of FIGS. 1-5. The invention may merely include any one or more features of any one or more embodiments of FIGS. 1-5. In other words, not all of the features displayed in the figures should be implemented in the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device supporting wideband operations, comprising:
- a ground element;
- a first radiation element, coupled to the ground element;
- a feeding radiation element, having a feeding point;
  - a second radiation element, coupled to the feeding radiation element, wherein the second radiation element is adjacent to the first radiation element;
- a connection radiation element, coupled to the feeding point;
- a third radiation element, coupled to the connection radiation element;
- a fourth radiation element, coupled to the connection radiation element, wherein the connection radiation element, the third radiation element and the fourth radiation element are adjacent to the first radiation element;
- a fifth radiation element, coupled to the connection radiation element; and
- a stamping metal element, coupled to the first radiation element, wherein the stamping metal element substantially extends along the first radiation element;
- wherein an antenna structure is formed by the first radiation element, the feeding radiation element, the second radiation element, the connection radiation element, the third radiation element, the fourth radiation element, the fifth radiation element and the stamping metal element.

2. The mobile device as claimed in claim 1, wherein the first radiation element substantially has a large L-shape.

3. The mobile device as claimed in claim 1, wherein the second radiation element substantially has a small L-shape.

4. The mobile device as claimed in claim 1, wherein a combination of the feeding radiation element, the connection radiation element, the third radiation element, the fourth radiation element and the fifth radiation element substantially has an H-shape.

5. The mobile device as claimed in claim 1, further comprising:

a dielectric substrate, wherein the first radiation element, the feeding radiation element, the second radiation element, the connection radiation element, the third radiation element, the fourth radiation element and the fifth radiation element are disposed on a specific surface of the dielectric substrate.

6. The mobile device as claimed in claim 5, wherein the stamping metal element comprises a first widening segment and a second widening segment, and the first widening segment and the second widening segment are positioned above the dielectric substrate and are substantially parallel to the specific surface.

7. The mobile device as claimed in claim 6, wherein the first widening segment has a first vertical projection on the specific surface of the dielectric substrate, and the first vertical projection at least partially overlaps both the first radiation element and the second radiation element.

8. The mobile device as claimed in claim 6, wherein the second widening segment has a second vertical projection on the specific surface of the dielectric substrate, and the second vertical projection overlaps neither the third radiation element nor the fifth radiation element.

9. The mobile device as claimed in claim 1, wherein the antenna structure covers a first frequency band, a second frequency band, a third frequency band, a fourth frequency band, and a fifth frequency band.

10. The mobile device as claimed in claim 9, wherein the first frequency band is from 600 MHz to 800 MHz, the second frequency band is from 800 MHz to 960 MHz, the third frequency band is from 1710 MHz to 2170 MHz, the fourth frequency band is from 2300 MHz to 2700 MHz, and the fifth frequency band is from 3300 MHz to 3800 MHz.

11. The mobile device as claimed in claim 9, wherein a length of the first radiation element is substantially equal to 0.25 wavelength of the first frequency band.

12. The mobile device as claimed in claim 9, wherein a length of the feeding radiation element is from 0.125 to 0.25 wavelength of the second frequency band.

13. The mobile device as claimed in claim 9, wherein a total length of the second radiation element, the feeding radiation element, the connection radiation element and third radiation element is substantially equal to 1 wavelength of the third frequency band.

14. The mobile device as claimed in claim 9, wherein a total length of the feeding radiation element and the second radiation element is substantially equal to 0.5 wavelength of the fourth frequency band.

15. The mobile device as claimed in claim 9, wherein a total length of the fourth radiation element, the connection radiation element and the fifth radiation element is substantially equal to 0.5 wavelength of the fifth frequency band.

* * * * *